Patented Oct. 26, 1937

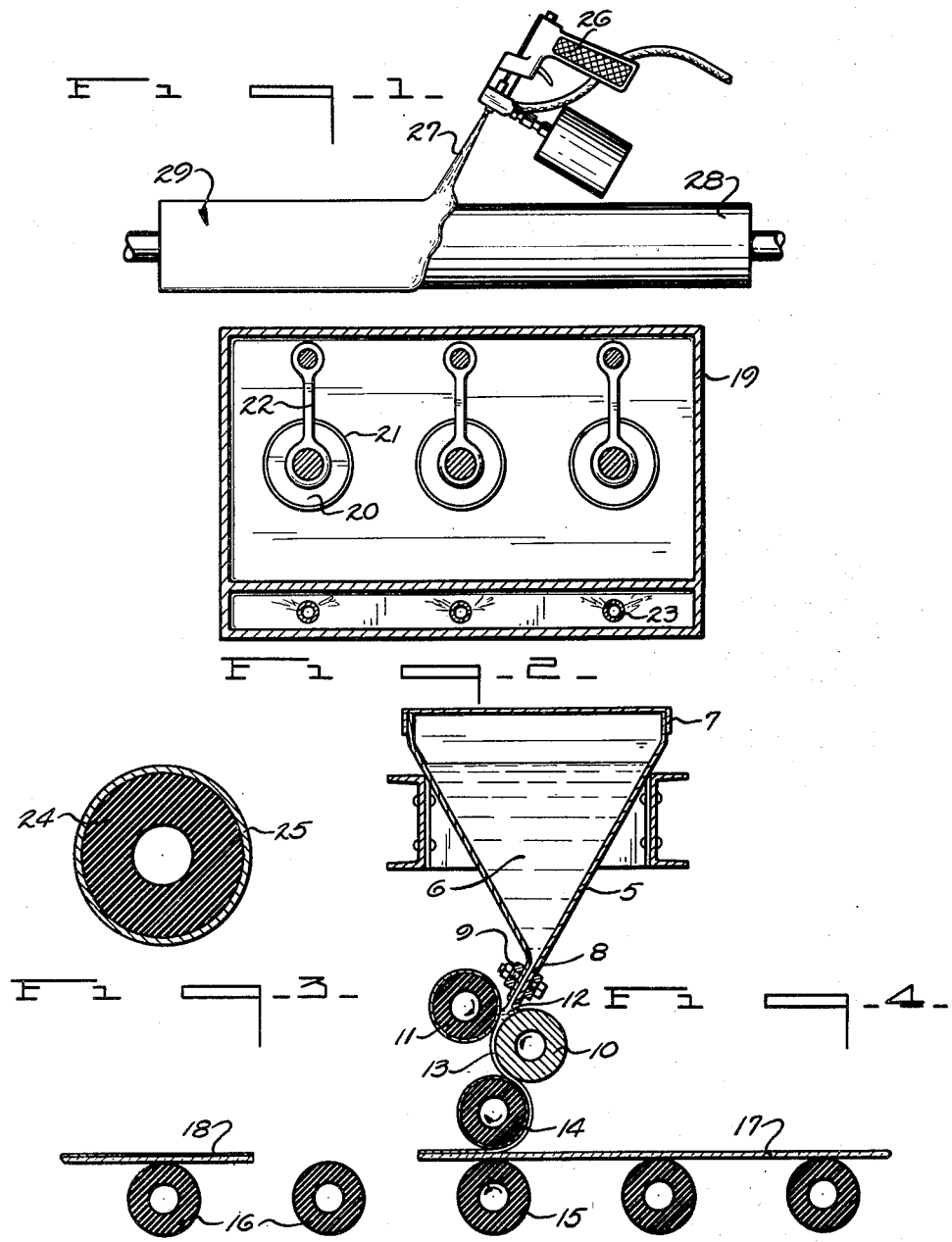

2,097,315

UNITED STATES PATENT OFFICE 2,097,315

COATING ROLL AND PROCESS OF PRODUCING THE SAME

George B. Watkins, Toledo, Ohio, assignor to Libbey-Owens-Ford Glass Company, Toledo, Ohio, a corporation of Ohio Application February 20, 1931, Serial No. 517,157

4 Claims. (Cl. 91—67.8)

The present invention relates to an improved roll or the like and to the process of producing the same by treating or coating the surfaces thereof in a manner that material coming in contact therewith will not be adversely affected.

The primary object of the invention is to provide a method of treating or coating roll surfaces or the like, that might have a tendency to "chalk off" or release small particles thereof or which might tend to discolor or otherwise contaminate material coming in contact with said roll, in a manner that the roll or the like can be satisfactorily used without contaminating or otherwise adversely affecting such material.

Other objects and advantages of the invention will become more apparent during the course of the following description when taken in connection with the accompanying drawing.

In the drawing wherein like numerals are employed to designate like parts throughout the same, Fig. 1 represents diagrammatically one way in which a roll may be treated in accordance with the present invention, Fig. 2 is a diagrammatic representation of a baking oven which can be used in treating the deposit made upon the roll, Fig. 3 is an enlarged cross section showing in an exaggerated manner the treated roll, and Fig. 4 is a vertical transverse section through one form of machine in which the invention can be put to practical use.

The present invention relates more particularly to the treatment of compressible materials, for example, rubber or rubber compositions, but it is to be understood that the same treatment is contemplated for other forms of material. When making rolls or other like devices from rubber or rubber compositions for use in conveying systems, washing machines, coating machines, etc., and especially where solvents are employed, there is a tendency for "chalking off" of small particles of said rubber material, thereby contaminating or otherwise adversely affecting the material coming in contact with the roll. Also, where such rolls are used in coating machines, for example, where liquids containing solvents come in contact with the roll, the said material becomes contaminated, sometimes causing a discoloration of the material and also an acceleration of decomposition thereof.

While the present application is directed broadly to the treatment of surfaces in the manner above indicated, and while the invention as applied to the laminated glass art is being claimed in an application being filed of even date herewith, nevertheless by way of example, apparatus for use in the laminating of composite or safety glass is mentioned. The particular machine illustrated in Fig. 4 of the drawing is a machine which has been used in commercial production in the manufacture of safety glass and is designed to apply a coating of adhesive or other bonding agent to one or more of the laminations going to make up the safety glass.

Safety glass ordinarily comprises two sheets of glass with an interposed sheet of plastic material, for example, pyroxylin plastic, the glass and plastic being suitably treated and bonded together by the aid of an adhesive or other bonding agent. In the production of this type of glass, extreme care should be exercised in the selection of materials and in the assembling of the laminations to hold to a minimum the introduction of foreign material into the lamination and to also guard against an acceleration of the natural decomposition of the pyroxylin plastic.

In Fig. 4 of the drawing, the numeral 5 designates a hopper containing a mass of the bond inducing agent 6. The hopper 5 is provided with a removable cover at the top and a discharge spout 8 at the lower end, the opening of which is adjustable through the bolt means 9. Positioned beneath the discharge outlet of the receptacle 5 is a pair of rolls 10 and 11 forming a pocket which receives the supply 12 and which is spread over the entire surfaces of the rolls upon rotation thereof. For the purposes of illustration, the material is shown as flowing in sheet form 13 from the roll 10 to the roll 14, but in actual practice all three of the rolls 10, 11 and 14 have a thin film of the adhesive 6 thereon. A roll 15 is placed in opposition to the roll 14, and in conjunction with the rollers 16 forms a conveyor upon which the glass sheets or the like 17 may be passed in contact with the roll 14. By proper adjustment of the rolls 14 and 15, the desired gap can be created, thereby determining the pressure exerted upon the glass 17. It is to be preferred that both the rolls 14 and 15 be produced from compressible material so that the entire upper surface of the sheet material 17 will be coated with the adhesive or other bonding agent when being passed between the rolls.

In actual practice, a combination of metallic and rubber composition rollers have been found to be desirable. For example, the roll 10, in the illustration, is formed from metal, while the rolls 11, 14 and 15 are formed from rubber or a rubber composition. From the mechanical standpoint, such a combination of rolls permits of a very accurate and satisfactory depositing of material upon the glass or other sheet material. The numeral 18 is used to designate the deposit of adhesive upon the sheet material, although it will be appreciated that the drawing has been made in an exaggerated manner for the purposes of illustration. Although considerable experimental work has been done to produce a rubber roll that will give satisfactory service in the production of safety glass, so far considerable difficulty has been had by a so-called "chalking off" of small particles of the rubber material which contaminates the surfaces of the glass, plastic, or other medium when contacting therewith. Ordinarily, the mass of material 6 contains one or more solvents and apparently the solvent action, among other things, causes a "chalking off" of small rubber particles from the rolls and sometimes the adhesive material becomes contaminated due to contact with the rolls, causing a discoloration of the said material and also an acceleration of the natural decomposition of the plastic material used in the manufacture of safety glass. With some rolls, the acceleration of the decomposition has been so great as to produce a decided discoloration during the pressing of the laminations together under the combined action of heat and pressure. Normally, the heat and pressure treatment used in the manufacture of safety glass is not sufficient to cause a discoloration of the plastic or other ingredients used.

As above stated, the use of compressible rolls in conjunction with the metallic roll is of decided advantage because of their ability to spread a uniform and substantially predetermined deposit upon glass or other sheet material.

I have discovered that rubber composition rolls or the like can be made to work satisfactorily by treating or coating the surfaces thereof. For example, a varnish type of material such as a polyhydric alcohol-polybasic acid resin, known as the glyptol type of resin, can be sprayed or otherwise applied to the surfaces of the roll. Upon drying out, the film created on the surfaces of the roll will permit the use of said rubber rolls without contamination of the material coming in contact therewith. If the polyhydric alcohol-polybasic acid resin material is used, it can be sprayed when in solution upon the roll, and the roll then placed in a chamber 19, illustrated in Fig. 2, and there baked. As shown diagrammatically, the rolls 20, provided with the films 21, may be supported on the brackets 22 in the chamber and by means of heating elements 23, the films are subjected to a suitable drying or baking action. I have found that with the particular type of resin varnish mentioned above, the rolls will be satisfactory if treated for approximately fifteen hours at a temperature of about 125° C. This baking operation converts the resin mentioned to the so-called insoluble and infusible state so that it is not attacked by the solvents contained in the mixture 6.

Rolls treated in this manner have been placed in a machine such as illustrated in Fig. 4 and operated for a long period of time, showing that the "chalking off" of small particles of rubber and discoloration of the plastic and adhesive materials have been eliminated. In cases where considerable pressure is exerted with consequent flexing action, the coating may crack or check, but this does not seem to adversely affect the satisfactory use of the rolls.

After considerable usage, the rolls can again be treated so that the life of a rubber roll should be materially increased by my process, and furthermore, an unsatisfactory roll is made entirely satisfactory by such treatment.

In Fig. 3, an attempt is made to illustrate a rubber roll 24 after it has been provided with the film or coating 25. No doubt the film impregnates the surfaces of the roll and ordinarily the film produced is quite thin.

Although the invention has been described in connection with laminating apparatus, the same process can be used for treating rolls or like means for use in washing machines, conveyor systems, or in fact any place where material comes in contact with a rubber roll or the like and is susceptible to being contaminated by said roll.

The choice of coating film to be applied to the roll is dependent upon the nature of the materials coming in contact therewith. For example, in some instances, a cellulose acetate film could be formed on the rolls, provided the material coming in contact with the cellulose acetate film would not be solvent therefor in the range of temperatures used. On the other hand, if the material contacting with the roll would be solvent toward the cellulose acetate at the temperatures used, it would be necessary to use some substance other than cellulose acetate. Therefore, it will be understood that there are numerous types of lacquers and varnishes which would be expected to work equally well for coating rubber rolls or the like, care being exercised in selecting a coating material that would be insoluble in the fluid contacting it.

In Fig. 1, a spray gun 26 is used to apply the material 27 to the roll 28 to create the film 29, but the coating in some instances can be produced by dipping of the roll or otherwise. Also, it may be necessary to build up a satisfactory thickness of coating by several applications of the material 27.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:
1. As a new article of manufacture, a coating roll or like member comprising a rubber body portion, and a protective coating on said rubber body portion formed from a polyhydric alcohol-polybasic acid resin.

2. The process of producing a coating roll, which consists in providing a roll having a resilient body portion formed of rubber or a rubber composition, covering the rubber body portion with a relatively thin coating of a solution of polyhydric alcohol, polybasic acid resin, and in baking the roll for approximately fifteen hours at a temperature of approximately 125° C. to convert the resinous coating to the so-called insoluble and infusible state.

3. In apparatus for use in the manufacture of safety glass, a roll or like member comprising a rubber body portion, and a protective coating on said rubber body portion formed from a polyhydric alcohol-polybasic acid resin.

4. The process of producing a coating roll to be used in the manufacture of safety glass, which consists in providing a roll having a resilient body portion formed of rubber or a rubber composition, covering the rubber body portion with a relatively thin coating of a solution of polyhydric alcohol-polybasic acid resin, and in baking the roll for approximately fifteen hours at a temperature of approximately 125° C. to convert the resinous coating to the so-called insoluble and infusible state.

GEORGE B. WATKINS.